United States Patent
Garland et al.

(12)

(10) Patent No.: US 6,263,055 B1
(45) Date of Patent: Jul. 17, 2001

(54) SYSTEM FOR SUPPRESSED RINGING ACCESS OF SUBSCRIBER LINES TO IDENTIFY USAGE ANOMALIES OF CUSTOMER PREMISE EQUIPMENT CONNECTED THERETO

(75) Inventors: Stuart M. Garland, Morton Grove; David B. Smith; Matthew Richard Smith, both of Hinsdale, all of IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/150,055

(22) Filed: Sep. 9, 1998

(51) Int. Cl.[7] ................................................. H04M 11/00
(52) U.S. Cl. ............................... 379/106.05; 379/102.01; 379/102.02; 379/106.03; 379/106.08; 379/106.09
(58) Field of Search ..................... 379/102.07, 106.01, 379/106.03, 106.05, 106.09, 197, 1, 27, 29, 102.01, 102.02, 102.05

(56) References Cited

U.S. PATENT DOCUMENTS

| | | | | |
|---|---|---|---|---|
| 5,204,896 | * | 4/1993 | Oliver | 379/106.04 |
| 5,243,644 | * | 9/1993 | Garland et al. | 379/106.09 |
| 5,359,641 | * | 10/1994 | Schull et al. | 379/106.09 |
| 5,369,690 | * | 11/1994 | Comfort | 379/106.09 |
| 5,825,849 | * | 10/1998 | Garland et al. | 379/5 |
| 6,038,297 | * | 3/2000 | Garland et al. | 379/106.01 |

* cited by examiner

Primary Examiner—Ahmad Matar
Assistant Examiner—Bing Bui
(74) Attorney, Agent, or Firm—Duft, Graziano & Forest, P.C

(57) ABSTRACT

The usage detection system establishes a suppressed ringing connection to the subscriber line for either a predetermined extended time interval to enable at least two successive usage readings to be taken, or for a duration as determined by the telemetry equipment to perform the necessary usage readings to detect the presence of usage anomalies. This usage detection system communicates with the serving central office to establish a suppressed ringing connection, the duration of which is either under the control of the usage detection system or the telemetry equipment located at the customer premises. The usage detection system communicates with the telemetry equipment to identify the usage measurements that are desired. The parameters that are passed by the usage detection system to the telemetry equipment can include: identification of the telemetry equipment to be tested, number of successive usage readings, time interval between usage readings, anticipated usage rate, duration of usage measurement interval, return to service actions. This communication enables the telemetry equipment to actively perform the usage measurements without the intimate involvement of the usage detection system and within the single call connection and significantly reduces the number of call connections that are required to perform usage detection tests.

19 Claims, 3 Drawing Sheets

SYSTEM FOR SUPPRESSED RINGING ACCESS OF SUBSCRIBER LINES TO IDENTIFY USAGE ANOMALIES OF CUSTOMER PREMISE EQUIPMENT CONNECTED THERETO

CROSS-REFERENCE TO RELATED APPLICATIONS

This application is related to U.S. patent application Ser. No. 09/092,122, filed on Jun. 5,1998 and titled "System for Direct Suppressed Ringing Access of Subscriber Lines".

FIELD OF THE INVENTION

This invention relates to subscriber line access systems and, in particular, to a system that provides a service provider with access to a selected subscriber line via a suppressed ringing connection to enable the service provider to obtain data indicative of the usage parameters of selected customer premise equipment connected to the subscriber line and, in particular, to detect usage anomalies of the customer premise equipment.

PROBLEM

It is a problem in the field of telemetry monitoring for the telemetry service provider to determine the operational status of the customer premise equipment that is connected to the subscriber line. In telemetry applications, the telemetry equipment to be polled typically resides at the customer premises, such as a residence. The telemetry equipment can comprise utility meters, appliance controllers, medical monitoring equipment, security systems, telephone line test apparatus, and the like. The telemetry equipment is typically connected via the telephone company network interface unit to the serving subscriber line in a manner similar to an extension telephone.

The telemetry service provider access to the telemetry equipment is effected by the use of a Central Office Service Unit (COSU) that is connected to the serving central office switch via a plurality of dedicated Utility Telemetry Trunks (UTTs) or other network connection mechanism, such as a T1 or PRI link from the telemetry service provider. In operation, the telemetry application user, such as a utility company, dials or is directly connected to the Central Office Service Unit that functions to connect the telemetry applications user via one of the dedicated Utility Telemetry Trunks to the serving central office switch, which then provides a suppressed ringing connection to the selected subscriber line. The telemetry applications controller collects data from the polled telemetry equipment. The telemetry equipment is programmed to read usage data, transmit this data to the telemetry applications controller and then return on-hook, thereby terminating the call connection which immediately drops the trunk connection. The serving central office switch is programmed to set call connection duration timers to ensure that the suppressed ringing call does not last for more than a few seconds, thereby avoiding the possibility of "hung lines" due to a fault condition.

In this method of polling the telemetry equipment, at least two successive suppressed ringing connections must be made to determine whether there is an out of service condition in the telemetry equipment or the apparatus that the telemetry equipment serves. For example, a loss of electrical service at the customer premise is typically determined by measuring the difference between at least two readings of electricity usage, that are successively taken over a period of time. A measurable difference in the successive usage readings of expected magnitude indicates uninterrupted service. The absence of any change in the usage reading, or anomalies in the usage readings indicates a loss of service or a trouble condition, respectively. However, the need to take such successive readings at each subscriber line significantly increases the traffic, in terms of the network connections required, in the serving central office. These additional call connections add significant overhead in terms of call setup processing and significantly reduce the capacity of a trunk to handle telemetry calls. Multiple calls also run the risk of having the subscriber line in use, therefore requiring additional delay in the execution of the task.

SOLUTION

The above-described problems are solved and a technical advance achieved in the field by the system for suppressed ringing access to a subscriber line to detect usage anomalies in the telemetry equipment that is connected to this subscriber line (termed "usage detection system" herein). This usage detection system establishes a suppressed ringing connection to the subscriber line for either a predetermined extended time interval to enable at least two successive usage readings to be taken, or for a duration as determined by the telemetry equipment to perform the necessary usage readings to detect the presence of usage anomalies in real time.

This usage detection system communicates with the serving central office to establish a suppressed ringing connection, the duration of which is either under the control of the usage detection system or the telemetry equipment located at the customer premises. The usage detection system communicates with the telemetry equipment to identify the usage measurements that are desired. The parameters that are passed by the usage detection system to the telemetry equipment can include: identification of the telemetry equipment to be tested, number of successive usage readings, time interval between usage readings, anticipated usage rate, duration of usage measurement interval, return to service actions. This communication enables the telemetry equipment to actively perform the usage measurements without the intimate involvement of the usage detection system and within the single call connection. This significantly reduces the number of call connections that are required to perform usage detection tests and, by using the ability to empower the telemetry equipment to make the initial determination, minimize the connect time required for each call connection.

DETAILED DESCRIPTION

Figure 1:
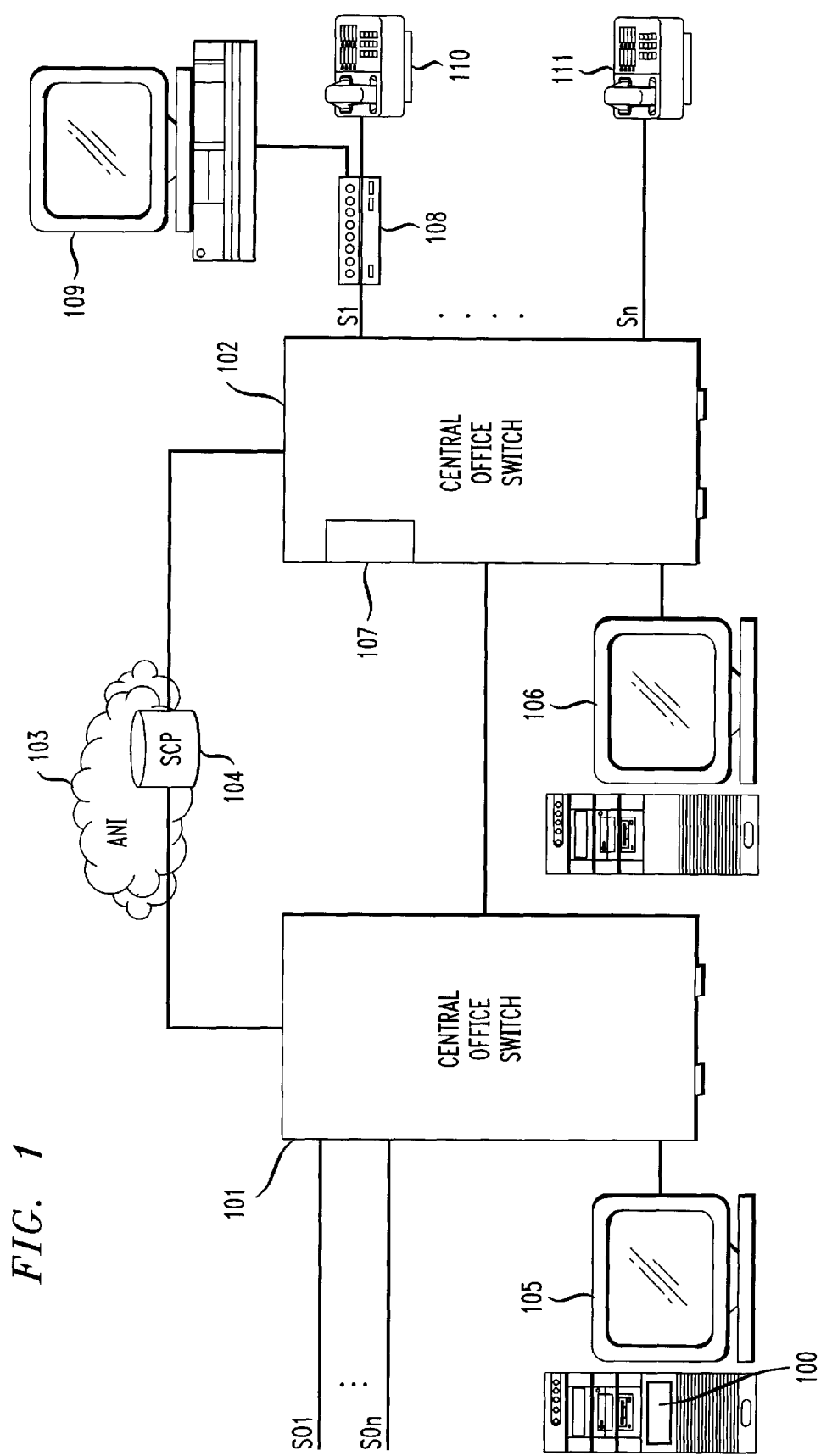
FIG. 1 illustrates in block diagram form the usage detection system and an operating environment in which such system is typically located.

FIG. 1 illustrates in block diagram form the usage detection system and an operating environment in which such system is typically located. In particular, a switching system, such as the central office switch 102, serves a plurality of local loops S1-Sn, termed "subscriber lines" herein. Each subscriber line S1 is typically terminated with some form of customer premise equipment, such as telephone station set 111 modem, telemetry equipment 106 or combinations of such equipment. In the present example, subscriber line S1 is terminated with a telephone station set 110 as well as a network interface unit 108 that serves to interconnect telephone station set 110 and at least one telemetry apparatus 109 to the subscriber line S1. This telemetry apparatus 109 is shown as a single element, but can comprise a plurality of elements, such as: utility meter telemetry equipment, appliance controllers, medical monitoring equipment and the like, that is accessible by means of a suppressed ringing connection.

Traditionally, suppressed ringing connections were used by utility companies to provide remote utility meter reading functions. This was accomplished by the use of a Central Office Service Unit (COSU) that was directly connected to the central office switch via dedicated Utility Telemetry Trunks (UTT) to thereby enable the COSU to connect the utility company telemetry polling unit to concurrently access a plurality of subscriber lines S1-Sn via the plurality of UTTs. However, the provision of dedicated UTTs presents a problem due to the fact that this equipment is expensive to provide and maintain even though its use is infrequent. This traditional COSU architecture can be used to implement the present usage detection system as well as the remote access architecture described herein. In particular, there are numerous ways of implementing a suppressed ringing access connection to a subscriber line through the switching network and these include the use of T1 connections as well as PRI connections. For simplicity of description, the remote access architecture is described as the environment in which the present usage detection system is implemented but this description is not intended to limit the scope of the described concept.

SUPPRESSED RINGING CONNECTIONS

A suppressed ringing connection comprises a connection through a switching system to a selected subscriber line, without ringing and with the provision of no features for that subscriber line, even if the subscriber has activated select features for that line. What this entails is the deactivation (or disregarding) of all local exchange carrier provided services, such as: call waiting, call forwarding, call blocking, to thereby enable the uninterrupted connection of the accessing service provider to the selected subscriber line. The interconnection of the service provider to the subscriber line enables the service provider to perform tests on this link and/or transmit any desired control signals directly to whatever apparatus is connected to the subscriber line and receive any responses therefrom.

DETERMINATION OF USAGE ANOMALIES

The usage detection system establishes a suppressed ringing connection to the subscriber line for either a predetermined extended time interval to enable at least two successive usage readings to be taken, or for a duration as determined by the telemetry equipment to perform the necessary usage readings to detect the presence of usage anomalies.

This usage detection system communicates with the serving central office to establish a suppressed ringing connection, the duration of which is either under the control of the usage detection system or the telemetry equipment located at the customer premises. The usage detection system communicates with the telemetry equipment to identify the usage measurements that are desired. The parameters that are passed by the usage detection system to the telemetry equipment can include: identification of the telemetry equipment to be tested, number of successive usage readings, time interval between usage readings, anticipated usage rate, duration of usage measurement interval, return to service actions. This communication enables the telemetry equipment to actively perform the usage measurements without the intimate involvement of the usage detection system and within the single call connection. This significantly reduces the number of call connections that are required to perform usage detection tests and, by using the ability to empower the usage detection process to make the initial determination, minimize the connect time required for each call connection.

USAGE DETECTION VIA A SUPPRESSED RINGING CONNECTION

Figure 2A:
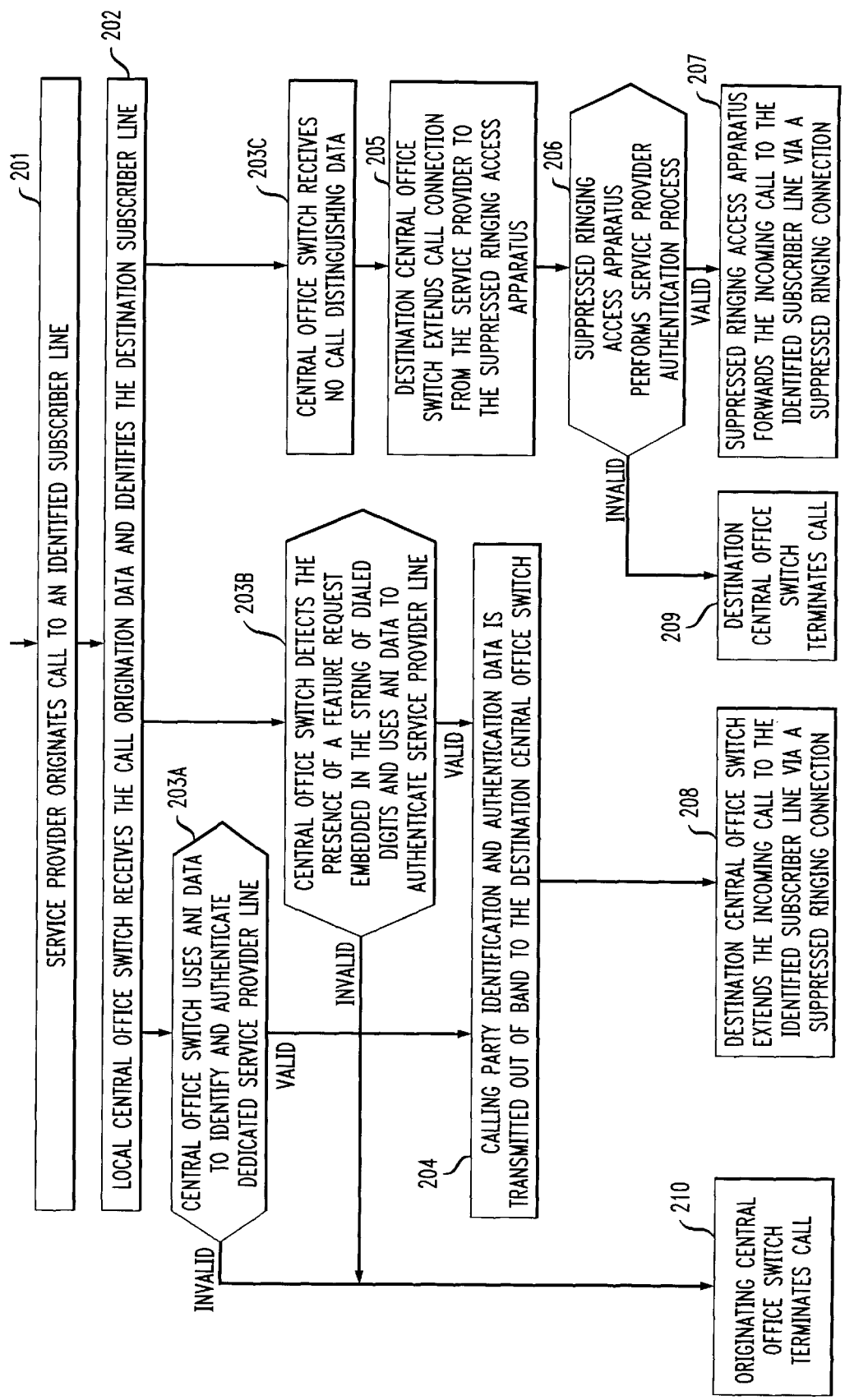
FIGS. 2A and 2B illustrate in flow diagram form the operational steps taken by the usage detection system to perform a typical subscriber line access operation.
Figure 2B:
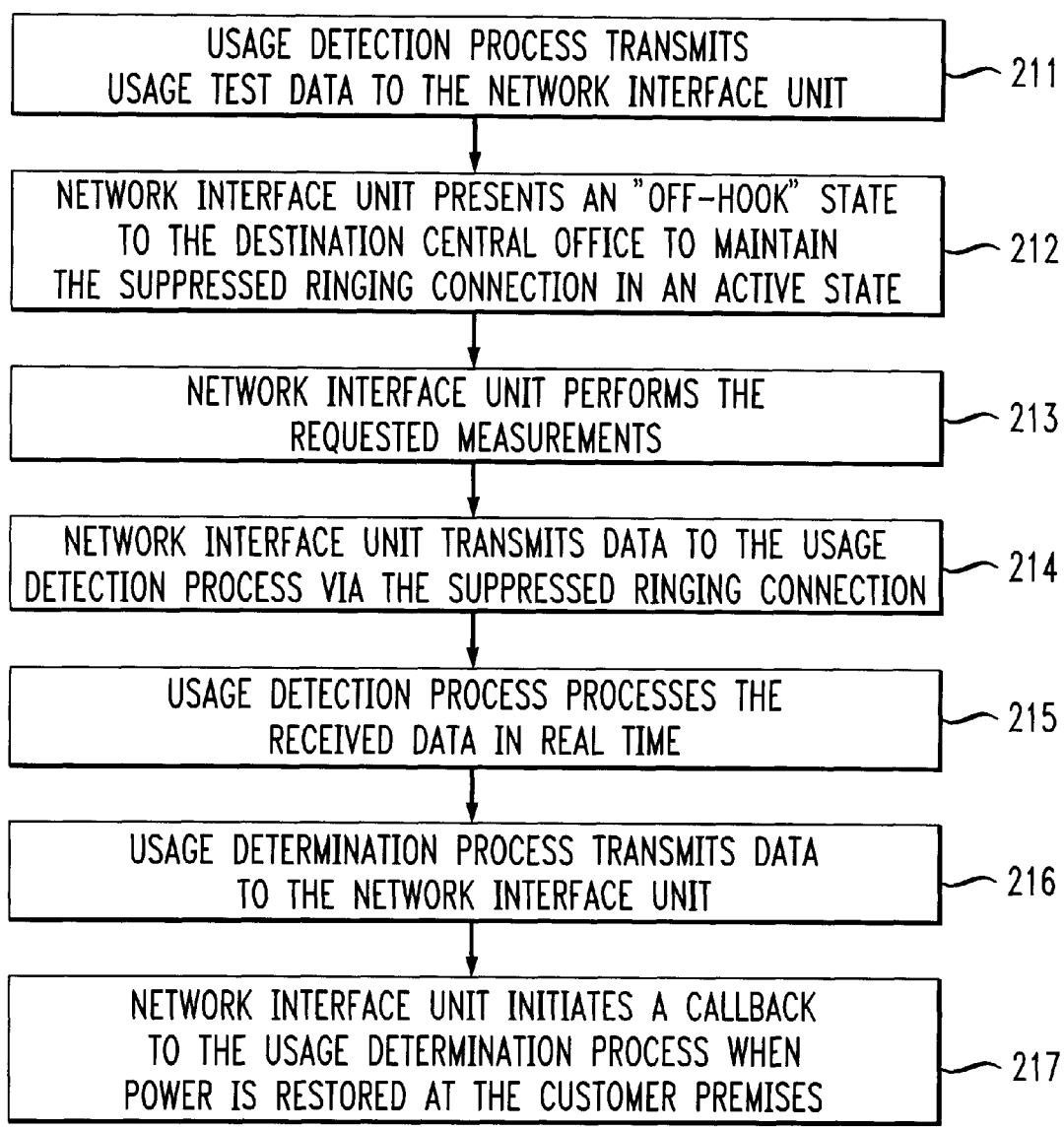

FIGS. 2A and 2B illustrate in flow diagram form the operational steps taken by the present usage detection system to perform a typical subscriber line access operation and usage detection operation, using the architecture that is disclosed in FIG. 1. The process begins at step 201 where the usage detection process 100 of service provider 105 originates a subscriber line access call to an identified subscriber line S1 served by a selected central office switch 102. The local central office switch 101 receives the call origination data at step 202 from the service provider 105 and identifies the destination subscriber line S1. The call origination data includes data that defines the requested duration of the suppressed ringing access call, as determined by the usage detection process.

The nature of the call can be determined by one of a plurality of methods. In particular, at step 203A, the central office switch 101 can use the Automatic Number Identification ANI data that is automatically generated by central office switch 101 as part of the call origination by the service provider 105 to identity this service provider line as one dedicated for suppressed ringing connection access. Thus, if the ANI either matches the list of dedicated lines stored in the memory of central office switch 101 or central office switch 102 (or an adjunct data processor associated therewith), or triggers an ANI lookup and subsequent access to service control point 104, the call origination is designated as a suppressed ringing connection request or abbreviated ringing connection request. Alternatively, at step 203B, central office switch 101 can detect the presence of a feature request embedded in the string of digits dialed by the service provider 105 as part of the call origination on a one of the lines SO1-SON. In particular, the service provider 105 can prepend a feature request code (*8*, for example) to the dialed digits that identify the destination subscriber line S1 to thereby request a suppressed ringing connection access to this destination. Furthermore, the feature request code can include data digits that further characterize the suppressed ringing call, such as call duration, type of data collection, abbreviated ring duration, and the like. The central office switch 101 then designates the call origination as a suppressed ringing connection request due to the presence of this code if the ANI data that is automatically generated by central office switch 101 as part of the call origination by the service provider 105 also identifies this service provider line as one dedicated for suppressed ringing connection access.

In either case, the line from which the service provider 105 originates the call is automatically identified by the local central office switch 101 and, if this line is defined as being authorized to initiate direct suppressed ringing connections to subscriber lines by means of the Calling Party ID and an associated Suppressed Ringing Bit indicative of such authorization (and possibly with the granularity that authorization is to access only to a certain class of subscriber lines), this data along with the calling party identification is transmitted out of band to the local central office switch 102 that serves the selected subscriber line S1 at step 204. This is accomplished by the use of the signal control point 104 of the intelligent network 103 that interconnects the central office switches 101, 102. Thus, when the call connection from the originating central office switch 101 reaches the terminating local central office switch 102, the call setup data is concurrently received via an out of band data channel 103. Upon receipt of the incoming call and the out of band call control data that associates a request a suppressed ringing connection access with the call connection to the designated subscriber line S1, the destination central office switch 102 establishes a suppressed ringing connection to the designated subscriber line S1 in well known fashion at step 208. If, however, the authentication of the service provider 105 fails, the call connection is rejected at step 210 and call processing exits.

The second category of suppressed ringing access call identification includes authorization on a per call basis. Thus, at step 203C, there is no indication from the service provider 105 to the central office switch 101 that the call origination is a suppressed ringing access connection, since the service provider 105 dials the number of a predefined access line, which connects the service provider 105 to a suppressed ringing access apparatus 107 that authenticates the identity of the service provider 105 and their authority to initiate a suppressed ringing access connection to the selected subscriber line S1. Thus, at step 205, the central office switch 102 connects the call connection from the service provider 105 to the suppressed ringing access apparatus 107. At step 206 the suppressed ringing access apparatus 107 performs a service provider authentication process, which comprises a validation, using well known authentication techniques such as passwords and the use of ANI data if available, of both the identity of the service provider 105 as well as their authority to obtain a suppressed ringing access connection to the destination subscriber line S1. This service provider authentication process can include access to a service profile for the service provider 105 to determine specific service control information, such as queue timing, call priority, and the like. Once the service provider authentication is accomplished, the suppressed ringing access apparatus 107 then forwards the incoming call to the identified subscriber line S1 via a suppressed ringing connection at step 207. However, if the service provider 105 authentication fails, the destination central office switch 102 rejects the call connection and call processing exits at step 209.

The telemetry equipment connected to the subscriber line S1 is programmed to read usage data, transmit this data to the service provider 105 and then return on-hook, thereby terminating the call connection which immediately drops the trunk connection. The destination central office switch 102 is programmed to set call connection duration timers to ensure that the suppressed ringing call does not last for more than a few seconds, thereby avoiding the possibility of "hung lines" due to a fault condition, and the usage detection process 100 of the service provider 105 can reset this timeout parameter in the destination central office switch 102 as part of the call setup process to enable the execution of successive usage reads. Once connected to the subscriber line, the usage detection process 100 of the service provider 105 can perform the desired usage anomaly detection test. As an optional capability, the telemetry equipment can be provisioned with a plurality of data registers to store a plurality of the last taken usage readings to provide a short history of usage at this subscriber line. For example, in the case of three data registers, the data registers can be configured pursuant to the protocol illustrated in the following table to store the present usage reading as well as the usage readings from the last two usage measurement times:

| | |
|---|---|
| Register 1 - Present usage reading | Value (1) |
| Register 2 - Last usage reading, X time earlier | Value (2) |
| Register 3 - Next earlier usage reading, 2X time earlier | Value (3) |

At step 211, the usage detection process 100 transmits usage test data to the selected subscriber line S1, which usage test data can include, but are not limited to: identification of the telemetry equipment to be tested, number of successive usage readings, time interval between usage readings, anticipated usage rate, duration of usage measurement interval, return to service actions. This data transmission can be effected through a standard protocol, such as that illustrated in the following table:

| | |
|---|---|
| Time interval-lapsed time between reads in seconds | 3 − (3 + X1) |
| Number of Continuous Reads (unit number) | 2 −(2 + X2) |
| Read CPE Out of Service Bit (Yes/No) | 0/1 |
| Reset Out of Service Bit (Yes/No) | 0/1 |
| Increase Read Interval by X Seconds | ABS (0 − (3 + XI) − X3) |
| Reset Tamper Bit (Yes/No) | 0/1 |
| Read Tamper Bit (Yes/No) | 0/1 |
| Require CPE to go Off-Hook (Yes/No) | 0/1 |
| Time interval-lapsed time between reads in seconds | 3 − (3 + XI) |
| Call Back Bit (Yes/No) | 0/1 |

At step 212, the selected telemetry equipment 109 presents an "off-hook" state to the destination central office 102 to maintain the suppressed ringing connection in an active state and at step 213 performs the requested measurements. The data produced by these measurements is transmitted through the network interface unit 108 to the usage detection process 100 via the suppressed ringing connection at step 214 and the usage detection process 100 processes the received data in real time at step 215 as it is transmitted through the network interface unit 108 to determine whether a usage anomaly is present at the telemetry equipment connected to this subscriber line. For example, there can be a power outage and the electric utility meter would produce readings indicative of an absence of electricity usage. This lack of power consumption would be identified by the usage determination process 100 as an out of service condition and the usage determination process 100 can transmit data at step 216 to the network interface unit 108 to initiate a call back to the usage determination process 100 at step 217 when power is restored at the customer premises served by this subscriber line. Another example of a usage anomaly is where the power consumption is excessive, indicative of an unusual load on the power line serving the customer premises. Similarly, the consumption of an excessive quantity of water or natural gas can be indicative of a leak in the supply line or on the customer premises. This anomaly condition can be identified by the usage detection process 100 comparing the present rate of consumption as measured in real time with the historic data for this customer premises and other typical customer premises. In this manner, real time determinations can be made from a remote location regarding the present state of the telemetry equipment that is located at the customer premises, without the need for successive suppressed ringing calls or the need for a utility company worker to be dispatched to the customer premises to perform tests.

Once the usage determination process 100 completes its usage determinations, it terminates the suppressed ringing connection at step 215 either by transmitting a command to the network interface unit 108 or upon the selected telemetry equipment 109 completing the designated series of measurements. The usage determination process 100 can place the subscriber line S1 on a watch list to reread the usage if the determined usage measurements fall below a predetermined value, for example if the usage determination is not conclusively indicative of an outage or leak condition.

SUMMARY

The usage detection system establishes a suppressed ringing connection to the subscriber line for either a predetermined extended time interval to enable at least two successive usage readings to be taken, or for a duration as determined by the telemetry equipment to perform the necessary usage readings to detect the presence of usage anomalies. The usage detection system then communicates with the telemetry equipment to identify the usage measurements that are desired and performs a usage determination in real time to identify usage anomalies. This significantly reduces the number of call connections that are required to perform usage detection tests and, by using the ability to empower the usage detection process to make the initial determination, minimize the connect time required for each call connection thereby conserving network resources. This system is also compatible with existing telemetry architecture standards.

What is claimed:

1. Apparatus for enabling a service provider to access customer premise equipment that is connected to a subscriber line served by a central office switch via a suppressed ringing connection to determine a present operating state of said customer premise equipment, comprising:

means for establishing suppressed ringing connection access for said service provider to said subscriber line; and means for determining in real time via said suppressed ringing connection a presence of a usage anomaly in said customer premise equipment that is connected to a subscriber line by maintaining said suppressed ringing connection to said subscriber line for the duration of test operations performed on said customer premise equipment, comprising:

means for performing a plurality of successively initiated measurements on said customer premise equipment over a predetermined time interval to obtain time separated measurements of a selected parameter; and means for maintaining said suppressed ringing connection to said subscriber line for the duration of said predetermined time interval.

2. The apparatus of claim 1 wherein said means for determining comprises:

means for transmitting to a terminal interface unit, that interconnects said customer premise equipment to said subscriber line, commands to activate said terminal interface unit to test said customer premise equipment to determine a present operational state of said customer premise equipment.

3. The apparatus of claim 2 wherein said means for determining further comprises:

means for instructing said customer premise equipment to perform a plurality of operations; and means for maintaining said suppressed ringing connection to said subscriber line for the duration of said plurality of operations.

4. The apparatus of claim 2 wherein said means for determining further comprises:

means for activating said customer premise equipment to assume control of said suppressed ringing connection.

5. The apparatus of claim 1 wherein said means for determining further comprises:

means for identifying a time delay between successive ones of said plurality of successively initiated measurements.

6. The apparatus of claim 1 wherein said means for determining comprises:

means for transmitting data to said customer premise equipment indicative of expected measurement results.

7. The apparatus of claim 1 wherein said means for determining comprises:

means for requesting said central office switch to maintain said suppressed ringing connection to said subscriber line for a predetermined amount of time.

8. A method for enabling a service provider to access customer premise equipment that is connected to a subscriber line served by a central office switch via a suppressed ringing connection to determine a present operating state of said customer premise equipment, comprising the steps of:

establishing suppressed ringing connection access for said service provider to said subscriber line; and determining in real time via said suppressed ringing connection a presence of a usage anomaly in said customer premise equipment that is connected to a subscriber line by maintaining said suppressed ringing connection to said subscriber line for the duration of test operations performed on said customer premise equipment, comprising:

performing a plurality of successively initiated measurements on said customer premise equipment over a predetermined time interval to obtain time separated measurements of a selected parameter; and maintaining said suppressed ringing connection to said subscriber line for the duration of said predetermined time interval.

9. The method of claim 8 wherein said step of determining comprises:

transmitting to a terminal interface unit, that interconnects said customer premise equipment to said subscriber line, commands to activate said terminal interface unit to test said customer premise equipment to determine a present operational state of said customer premise equipment.

10. The method of claim 9 wherein said step of determining further comprises:

instructing said customer premise equipment to perform a plurality of operations; and maintaining said suppressed ringing connection to said subscriber line for the duration of said plurality of operations.

11. The method of claim 9 wherein said step of determining further comprises:

activating said customer premise equipment to assume control of said suppressed ringing connection.

12. The method of claim 9 wherein said step of determining further comprises:

identifying a time delay between successive ones of said plurality of successively initiated measurements.

13. The method of claim 8 wherein said step of determining comprises:

transmitting data to said customer premise equipment indicative of expected measurement results.

14. The method of claim 8 wherein said step of determining comprises:

requesting said central office switch to maintain said suppressed ringing connection to said subscriber line for a predetermined amount of time.

15. Apparatus for enabling a service provider to access customer premise equipment that is connected to a subscriber line served by a central office switch via a suppressed ringing connection to determine a present operating state of said customer premise equipment, comprising:

means for establishing suppressed ringing connection access for said service provider to said subscriber line;

means for determining via said suppressed ringing connection a first measurement of a selected parameter said customer premise equipment that is connected to a subscriber line;

means for performing at least one additional successively initiated measurement on said customer premise equipment over a predetermined time interval to obtain time separated measurements of said selected parameter; and means for maintaining said suppressed ringing connection to said subscriber line for the duration of said predetermined time interval.

16. The apparatus of claim 15 wherein said means for determining comprises:

means for transmitting to a terminal interface unit, that interconnects said customer premise equipment to said subscriber line, commands to activate said terminal interface unit to test said customer premise equipment to perform said measurement of said selected parameter.

17. The apparatus of claim 16 wherein said means for determining further comprises:

means for activating said customer premise equipment to assume control of said suppressed ringing connection.

18. The apparatus of claim 15 wherein said means for determining comprises:

means for transmitting data to said customer premise equipment indicative of expected measurement results.

19. The apparatus of claim 15 wherein said means for determining comprises:

means for requesting said central office switch to maintain said suppressed ringing connection to said subscriber line for a predetermined amount of time.

* * * * *